United States Patent Office 2,878,269
Patented Mar. 17, 1959

2,878,269

STEROID ESTERS AND METHODS OF PREPARING SAME

Erwin F. Schoenewaldt, Metuchen, N. J., assignor to Merck & Co., Inc., Rahway, N. J., a corporation of New Jersey No Drawing. Application April 3, 1957
Serial No. 650,327

12 Claims. (Cl. 260—397.45)

This invention relates to hemicamphorate esters of steroids. More particularly, it is concerned with the C-21 α-hemicamphorate esters of physiologically active steroid hormones of the formula:

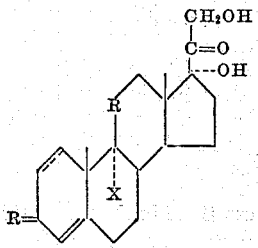

and with alkali metal salts of such esters. In this formula X may be a hydrogen or fluorine atom, and R is >C=O or >CHOH. In addition to the double bond in the 4:5 position, these new esters may have a second double bond in conjunction with the 3-keto substituent, i. e. in the 1:2 position.

Our new esters have at position 21 of the steroid nucleus the structure:

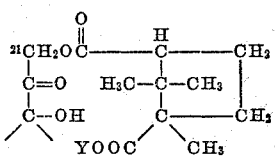

where Y may be hydrogen or an alkali metal. They have the physiological activity of the parent steroid alcohols, are very stable and, in the form of their alkali metal salts, are water soluble. By virtue of our invention, the steroid hormones particularly adapted for use in ophthalmic preparations and for other applications where solutions are preferable to suspensions or creams are made available. The steroid organic esters available heretofore have not been completely satisfactory for making aqueous solutions due either to low solubility in water or to a lack of stability on long periods of storage.

The α-hemicamphorate esters are prepared by reacting together in the presence of a suitable amine the steroid alcohol and d-camphoric anhydride. An excess of the anhydride is ordinarily employed in order to obtain the optimum yield of the desired ester. As amines, we use compounds such as pyridine, the collidines, lutidines, trialkylamines such as trimethylamine and triethylamine, and the like. In a preferred embodiment of the process, the esterification is brought about in a mixture of pyridine and triethylamine, the pyridine functioning primarily as solvent and the triethylamine as a catalyst. The steroid α-hemicamphorate is recovered from the reaction mixture by methods known in the art. One convenient method is careful addition of the reaction mixture to water and precipitation of the free acid by acidification of the aqueous solution. Treatment of the free acid with an aqueous solution of an alkali metal base, such as sodium or potassium carbonate, or sodium and potassium hydroxide affords the corresponding water-soluble hemicamphorate alkali metal salt.

The esterification step is preferably carried out at elevated temperatures of from about 75–125° C., and conveniently at the reflux temperature of the liquid amine. The time required for substantial completion of the reaction varies with the particular steroid and with the amine employed. In a preferred embodiment of the process using a pyridine-triethylamine reaction medium, good results are obtained in from about ½ to 4 hours at reflux temperature. In order to minimize decomposition of the steroid reactant, it is desirable to esterify in an inert atmosphere, but it will be appreciated that this is not essential to the success of the reaction itself.

Typical of the physiologically active steroids which may be treated with d-camphoric anhydride according to our process are:

$\Delta^4$-pregnane-11β,17α,21-triol-3,20-dione
$\Delta^{1,4}$-pregnadiene-11β,17α,21-triol-3,20-dione
9α-fluoro-$\Delta^{1,4}$-pregnadiene-11β,17α,21-triol-3,20-dione
9α-fluoro-$\Delta^4$-pregnene-11β,17α,21-triol-3,20-dione
$\Delta^{1,4}$-pregnadien-17α,21-diol-3,11,20-dione
$\Delta^4$-pregnen-17α,21-diol-3,11,20-dione The alkali metal salts of the stable 21-α-hemicamphorate esters thus obtained are water soluble. For ophthalmic preparations, for example, a 2.5–5% solution of the steroid ester salt in water is sterilized, usually with a small amount of a bacteriostatic agent present, and then subdivided into suitable vials.

The following examples are given for purposes of illustration and not by way of limitation:

EXAMPLE 1

$\Delta^4$-pregnane-11β,17α,21-triol-3,20-dione-21-α-hemicamphorate

To 510 mgs. of $\Delta^4$-pregnene-11β,17α,21-triol-3,20-dione and 5.0 grams of d-camphoric anhydride in a 100 ml. flask equipped with stirrer, condenser, drying tube, and heating mantle is added 20 ml. of dry pyridine and 10 ml. of triethylamine. The solution is heated under reflux for three hours. The dark red solution is then added to 600 ml. of water. Insoluble material is filtered off and the turbid filtrate carefully shaken with 100 ml. ethyl acetate. The aqueous layer is acidified with dilute hydrochloric acid and the precipitated semi-solid extracted with 300 ml. of ethyl acetate. The dried organic solvent extract is evaporated to dryness in vacuo leaving a solid which is crystallized by trituration with 100 ml. of hot acetone. The crystalline residue is recrystallized from methanol-acetone to yield $\Delta^4$-pregnene-11β,17α,21-triol-3,20-dione 21-α-hemicamphorate, melting point 264–269° C., $\lambda_{max}^{MeOH}$ 242.0 m$\mu$, E% 297

Following the above procedure, 9α-fluoro-$\Delta^4$-pregnene-11β,17α,21-triol-3,20-dione is converted by reaction with d-camphoric anhydride into its 21-α-hemicamphorate.

EXAMPLE 2

$\Delta^{1,4}$-pregnadiene-11β,17α,21-triol-3,20-dione
21-α-hemicamphorate 35 ml. of dry pyridine and 18 ml. of dry triethylamine are added to one gram of $\Delta^{1,4}$-pregnadiene-11β,17α,21-triol-3,20-dione and ten grams of d-camphoric anhydride in a 250 ml. flask. The mixture is heated at the reflux temperature for two and one-half hours and the solution then added slowly to one liter of water. Any solid material is removed by filtration and the filtrate extracted with two 100 ml.-portions of ethyl acetate. The layers are separated and the aqueous layer acidified with 2.5 N hydrochloric acid. The solid which forms is extracted into about 350 ml. of ethyl acetate and the organic extract, after washing with water, is dried over magnesium sulfate and concentrated to dryness in vacuo. The residual material is triturated with warm acetone and then recrystallized from methanol-acetone to give substantially pure $\Delta^{1,4}$-pregnadiene-11$\beta$,17$\alpha$,21-triol-3,20-dione 21-$\alpha$-hemicamphorate.

The 21-$\alpha$-hemicamphorate ester of $\Delta^{1,4}$-pregnadien-17$\alpha$,21-diol-3,11,20-trione is obtained by treating $\Delta^{1,4}$-pregnadien-17$\alpha$,21-diol-3,11,20-trione with d-camphoric anhydride under the above-described conditions.

Any departure from the above description which conforms to the present invention is intended to be included within the scope of the claims.

What is claimed is:

1. A compound having the formula:

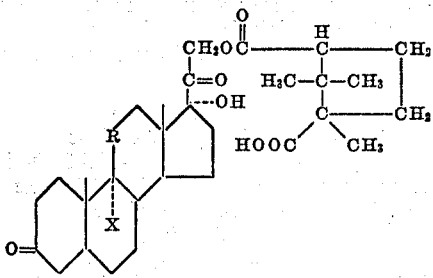

having a double bond in the 4:5 position, wherein R is selected from the groupings >C=O and >CHOH and X is selected from the class consisting of hydrogen and fluorine and alkali metal salts thereof.

2. 9$\alpha$-fluoro-$\Delta^4$-pregnene-11$\beta$,17$\alpha$,21-triol-3,20-dione 21-$\alpha$-hemicamphorate.

3. $\Delta^4$-pregnene-11$\beta$,17$\alpha$,21-triol-3,20-dione 21-$\alpha$-hemicamphorate.

4. $\Delta^{1,4}$-pregnadiene-11$\beta$,17$\alpha$,21-triol-3,20-dione 21-$\alpha$-hemicamphorate.

5. $\Delta^{1,4}$-pregnadien-17$\alpha$,21-diol-3,11,20-trione 21-$\alpha$-hemicamphorate.

6. The process for preparing a steroid 21-$\alpha$-hemicamphorate ester which comprises treating a compound of the formula:

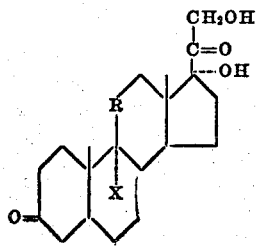

having a double bond in the 4:5 position with d-camphoric anhydride in the presence of an amine, wherein R is selected from the groupings >C=O and >CHOH and X is selected from the class consisting of hydrogen and fluorine.

7. The process of claim 6 wherein the amine is pyridine.

8. The process of claim 6 wherein the amine is a mixture of pyridine and triethylamine.

9. The process which comprises treating 9$\alpha$-fluoro-$\Delta^4$-pregnene-11$\beta$,17$\alpha$,21-triol-3,20-dione with d-camphoric anhydride in the presence of pyridine and triethylamine thereby forming 9$\alpha$-fluoro-$\Delta^4$-pregnene-11$\beta$,17$\alpha$,21-triol-3,20-dione 21-$\alpha$-hemicamphorate.

10. The process which comprises treating $\Delta^4$-pregnene-11$\beta$,17$\alpha$,21-triol-3,20-dione with d-camphoric anhydride in the presence of pyridine and triethylamine thereby forming $\Delta^4$-pregnene-11$\beta$,17$\alpha$,21-triol-3,20-dione 21-$\alpha$-hemicamphorate.

11. The process which comprises treating $\Delta^{1,4}$-pregnadiene-11$\beta$,17$\alpha$,21-triol-3,20-dione with d-camphoric anhydride in the presence of pyridine and triethylamine thereby forming $\Delta^{1,4}$-pregnadiene-11$\beta$,17$\alpha$,21-triol-3,20-dione 21-$\alpha$-hemicamphorate.

12. The process which comprises treating $\Delta^{1,4}$-pregnadien-17$\alpha$,21-triol-3,11,20-trione with d-camphoric anhydride in the presence of pyridine and triethylamine thereby forming $\Delta^{1,4}$-pregnadien-17$\alpha$,21-diol-3,11,20-trione 21-$\alpha$-hemicamphorate.

References Cited in the file of this patent

UNITED STATES PATENTS 2,736,681    Tishler _____ Feb. 28, 1956

OTHER REFERENCES

"Organic Chemistry," Fieser and Fieser, published by the Reinhold Publishing Corporation (1956), New York, pages 942–943.